(12) United States Patent
Tachibana et al.

(10) Patent No.: US 11,826,828 B2
(45) Date of Patent: Nov. 28, 2023

(54) GAS SUPPLY DEVICE FOR MANUFACTURING DEVICE. ATOMIZING DEVICE, 3D ADDITIVE MANUFACTURING DEVICE, ADDITIVE MANUFACTURING SYSTEM, AND SHAPED OBJECT AND GAS SUPPLY METHOD FOR MANUFACTURING DEVICE

(71) Applicant: MITSUBISHI HEAVY INDUSTRIES, LTD., Tokyo (JP)

(72) Inventors: Takahiro Tachibana, Tokyo (JP); Yasuyuki Fujiya, Tokyo (JP); Masayuki Ota, Tokyo (JP)

(73) Assignee: MITSUBISHI HEAVY INDUSTRIES, LTD., Tokyo (JP)

( * ) Notice: Subject to any disclaimer, the term of this patent is extended or adjusted under 35 U.S.C. 154(b) by 244 days.

(21) Appl. No.: 17/112,030

(22) Filed: Dec. 4, 2020

(65) Prior Publication Data
US 2021/0178488 A1 Jun. 17, 2021

(30) Foreign Application Priority Data
Dec. 13, 2019 (JP) .................................. 2019-225669

(51) Int. Cl.
*B22F 12/70* (2021.01)
*B22F 10/25* (2021.01)
(Continued)

(52) U.S. Cl.
CPC .............. *B22F 12/70* (2021.01); *B22F 10/25* (2021.01); *B29C 64/364* (2017.08);
(Continued)

(58) Field of Classification Search
CPC .......... B22F 10/25; B22F 10/32; B22F 12/70; B22F 2009/0832; B22F 2201/10; B22F 2201/00; B33Y 30/00; B33Y 40/00; F17C 13/025; F17C 2221/03; F17C 2227/0157; F17C 2250/032; F17C 2250/043; F17C 2270/05; F17C 7/00; Y02P 10/25; B29C 64/364; B29C 64/371
See application file for complete search history.

(56) References Cited

U.S. PATENT DOCUMENTS

| 2014/0165648 A1 | 6/2014 | Ha et al. |
| 2015/0056113 A1 | 2/2015 | Srivastava et al. |

(Continued)

FOREIGN PATENT DOCUMENTS

| CN | 201446232 | 5/2010 |
| CN | 104245090 | 12/2014 |

(Continued)

*Primary Examiner* — Philip C Tucker
*Assistant Examiner* — Jimmy R Smith, Jr.
(74) *Attorney, Agent, or Firm* — Wenderoth, Lind & Ponack, L.L.P.

(57) ABSTRACT

A gas supply device for a manufacturing device includes an inert gas supply source that supplies inert gas, a supply line connected to the inert gas supply source, a nitrogen removal portion that is provided on the supply line and that removes at least a portion of nitrogen in the inert gas, and an oxygen removal portion that is provided on the supply line and that removes at least a portion of oxygen in the inert gas.

10 Claims, 10 Drawing Sheets

(51) Int. Cl.
  *B33Y 30/00* (2015.01)
  *B29C 64/364* (2017.01)
  *B33Y 50/02* (2015.01)
  *B29C 64/371* (2017.01)
  *B29C 64/393* (2017.01)
  *F17C 7/00* (2006.01)
  *F17C 13/02* (2006.01)

(52) U.S. Cl.
  CPC .......... *B29C 64/371* (2017.08); *B29C 64/393* (2017.08); *B33Y 30/00* (2014.12); *B33Y 50/02* (2014.12); *F17C 7/00* (2013.01); *F17C 13/025* (2013.01); *B22F 2201/10* (2013.01); *F17C 2221/03* (2013.01); *F17C 2227/0157* (2013.01); *F17C 2250/032* (2013.01); *F17C 2250/043* (2013.01); *F17C 2270/05* (2013.01)

(56) References Cited

U.S. PATENT DOCUMENTS

| | | |
|---|---|---|
| 2015/0129583 A1 | 5/2015 | Richter et al. |
| 2016/0045981 A1 | 2/2016 | Zurecki et al. |
| 2016/0207147 A1* | 7/2016 | Van Hassel ............ B22F 12/70 |
| 2018/0117675 A1 | 5/2018 | Foret et al. |

FOREIGN PATENT DOCUMENTS

| | | |
|---|---|---|
| CN | 108017043 | 5/2018 |
| CN | 108326522 | 7/2018 |
| DE | 10 2012 206 125 | 10/2013 |
| DE | 10 2014 222 307 | 5/2016 |
| GB | 726735 | 3/1955 |
| GB | 726735 A * | 3/1955 |
| JP | 2003-328007 | 11/2003 |
| JP | 2004-183049 | 7/2004 |
| JP | 2008-137875 | 6/2008 |
| JP | 2009-035770 | 2/2009 |
| JP | 2011-178627 | 9/2011 |
| JP | 5392695 | 1/2014 |
| JP | 2014-034493 | 2/2014 |
| JP | 2015-000997 | 1/2015 |
| JP | 2019-209647 | 12/2019 |

* cited by examiner

GAS SUPPLY DEVICE FOR MANUFACTURING DEVICE. ATOMIZING DEVICE, 3D ADDITIVE MANUFACTURING DEVICE, ADDITIVE MANUFACTURING SYSTEM, AND SHAPED OBJECT AND GAS SUPPLY METHOD FOR MANUFACTURING DEVICE

CROSS-REFERENCE TO RELATED APPLICATIONS

This application claims the benefit of priority to Japanese Patent Application Number 2019225669 filed on Dec. 13, 2019. The entire contents of the above-identified application are hereby incorporated by reference.

TECHNICAL FIELD

The present disclosure relates to a gas supply device for a manufacturing device, an atomizing device, a 3D additive manufacturing device, an additive manufacturing system, and a shaped object and a gas supply method for a manufacturing device.

RELATED ART

The use of a 3D additive manufacturing method to manufacture a component has been increasing in recent years. In particular, as an example of an additive manufacturing method using metal powder, a method called a powder bed method is widely used. In this method, metal powder is spread on a bed, and a shaping target portion is irradiated with a laser or an electron beam functioning as a heat source, to melt and solidify the metal powder. A shaped object can be obtained by repeating this process.

The metal powder as described above has large surface area. Thus, an oxide layer is likely to be formed in the surface, and oxygen content of a final shaped object tends to become large. In addition, since melting and solidifying is repeated in a high-temperature environment due to a laser or an electron beam, oxygen in a workspace atmosphere tends to be incorporated into a shaped object. In the case of large oxygen content as described above, in a shaped object including, for example, a nickel alloy as a base material, creep strength decreases. Moreover, in a shaped object including a copper alloy as a base material, hydrogen embrittlement is likely to occur. Thus, as described in JP 2011-178627 A, it is conceivable to use a deoxidization pump to make oxygen partial pressure of a workspace atmosphere extremely smaller.

SUMMARY

However, even when oxygen partial pressure is lowered as described above, nitrogen in an atmosphere tends to be incorporated into a shaped object. In this case, as with the case of large oxygen content, quality of a product decreases due to nitridation.

The present disclosure is made to solve the problems described above, and an object of the present disclosure is to provide a gas supply device for a manufacturing device, an atomizing device, a 3D additive manufacturing device, an additive manufacturing system, and a shaped object and a gas supply method for a manufacturing device capable of realizing higher quality.

Solution to Problem

To solve the problems described above, a gas supply device for a manufacturing device according to the present disclosure includes an inert gas supply source that supplies inert gas, a supply line connected to the inert gas supply source, a nitrogen removal portion that is provided on the supply line and that removes at least a portion of nitrogen in the inert gas, and an oxygen removal portion that is provided on the supply line and that removes at least a portion of oxygen in the inert gas.

According to a gas supply device for a manufacturing device, an atomizing device, a 3D additive manufacturing device, an additive manufacturing system, and a shaped object and a gas supply method for a manufacturing device of the present disclosure, higher quality can be realized.

BRIEF DESCRIPTION OF DRAWINGS

The disclosure will be described with reference to the accompanying drawings, wherein like numbers reference like elements.

DESCRIPTION OF EMBODIMENTS

Configuration of Additive Manufacturing System

Figure 1:
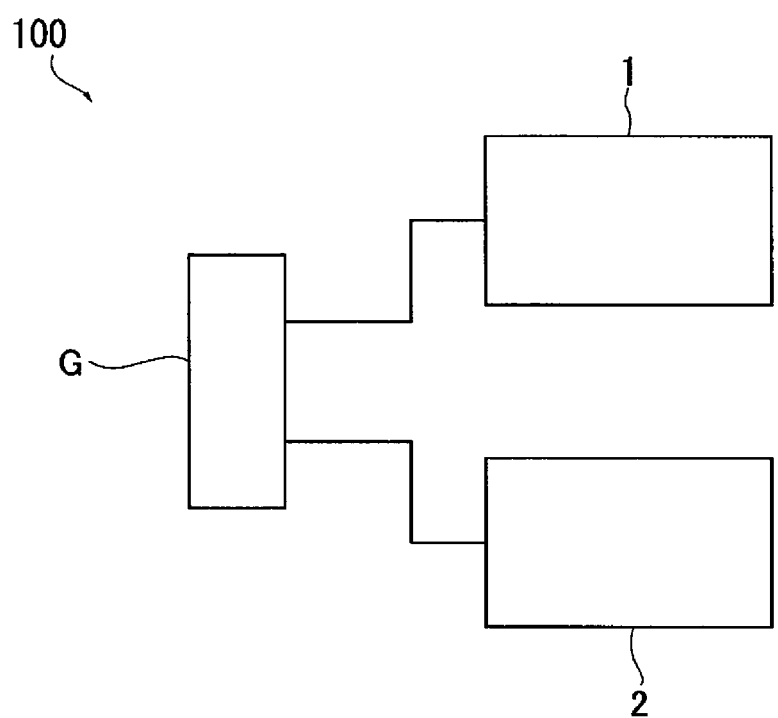
FIG. 1 is a system diagram illustrating a configuration of an additive manufacturing system according to an embodiment of the present disclosure.

Hereinafter, an additive manufacturing system 100 according to an embodiment of the present disclosure will be described with reference to FIGS. 1 to 7. The additive manufacturing system 100 according to the present embodiment is a device for manufacturing a three-dimensional shaped object, for example, by melting and layering metal powder. As illustrated in FIG. 1, the additive manufacturing system 100 includes an atomizing device 1 and a 3D additive manufacturing device 2.

The atomizing device 1 is used to generate fine metal powder by solidifying a molten metal into a particulate form. A configuration of the atomizing device 1 will be described in detail below. The 3D additive manufacturing device 2 irradiates metal powder generated by the atomizing device 1 with, for example, a laser beam, to melt and solidify the metal powder on the laser beam. A three-dimensional shaped object is manufactured by repeating this processing and stacking a plurality of layers. A configuration of the 3D additive manufacturing device 2 will be described in detail below. An inert gas supply source G that is a portion of a gas supply device for a manufacturing device SG described below is connected to the atomizing device 1 and the 3D additive manufacturing device 2. The inert gas supply source G is a vessel that stores and supplies inert gas including, for example, argon as a main component. In general, commercially available inert gas include oxygen and nitrogen by small quantity. That is, in the inert gas supply source G described above, the inert gas is stored in a state where oxygen, nitrogen, or other chemical species are mixed, in addition to argon as a main component.

Configuration of Atomizing Device

Figure 2:
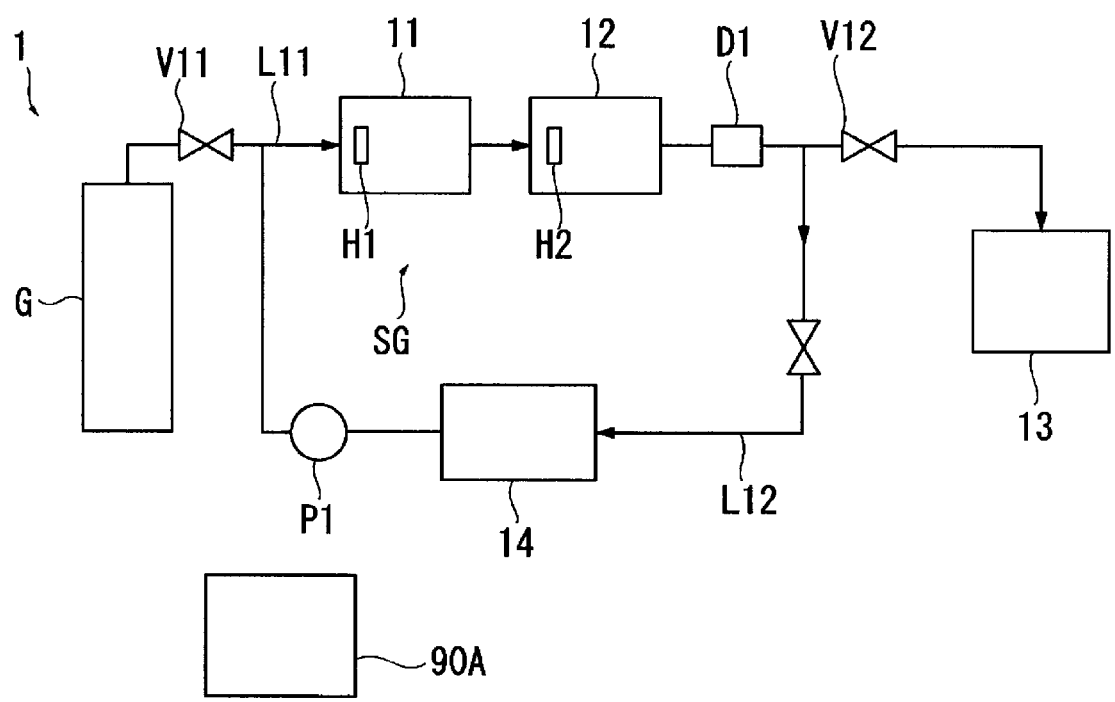
FIG. 2 is a system diagram illustrating a configuration of an atomizing device according to an embodiment of the present disclosure.

Next, the configuration of the atomizing device 1 will be described with reference to FIG. 2. As illustrated in FIG. 2, the atomizing device 1 includes the gas supply device for a manufacturing device SG and an atomizer 13.

The gas supply device for a manufacturing device SG is a device for removing at least a portion of oxygen and nitrogen in the inert gas supply source G described above and supplying the atomizer 13 that follows. Specifically, the gas supply device for a manufacturing device SG includes the inert gas supply source G described above, a supply line L11 connected to the inert gas supply source G, a nitrogen removal portion 11, an oxygen removal portion 12, a detection portion D1, a circulation line L12, a circulation compressor P1, a first valve device V11, a second valve device V12, a tank 14, and a first control device 90A.

The nitrogen removal portion 11 generates intermediate gas by removing at least a portion of a nitrogen component in the inert gas. As an example of the nitrogen removal portion 11, a known nitrogen removal filter is suitably used. The filter includes a filter member made of titanium, and a heater (heating portion H1) that heats the filter member to approximately 1000° C. The nitrogen component is absorbed by the filter member by causing the inert gas flowing on the supply line L11 to pass through the filter member heated.

The oxygen removal portion 12 is disposed on the supply line L11 in series in the downstream side of the nitrogen removal portion 11. The oxygen removal portion 12 removes at least a portion of an oxygen component from the intermediate gas discharged from the nitrogen removal portion 11. As an example of the oxygen removal portion 12, a device using a known oxygen pump is suitably used. Although not illustrated in detail, in this type of device, a voltage is applied to a pipe line in a state where target gas flows through the pipe line formed of a solid electrolyte such as yttria-stabilized zirconia. Then, oxygen ions in the gas are ionized, pass through a wall of the pipe line, and are removed to the outside. Accordingly, the oxygen component in the gas can be removed. In addition, as with the nitrogen removal portion 11 described above, the oxygen removal portion 12 also includes a heater (heating portion H2) that heats the inert gas. The inert gas is heated by this heater to approximately 600° C., for example. The intermediate gas having passed through the oxygen removal portion 12 includes no oxygen or a very small amount of oxygen (as treated gas) and is fed to the atomizer 13 in the downstream side. Note that temperature of the inert gas fed to the atomizer 13 is lower than temperature of the inert gas heated by the heating portions H1 and H2 (room temperature, for example).

Figure 10:
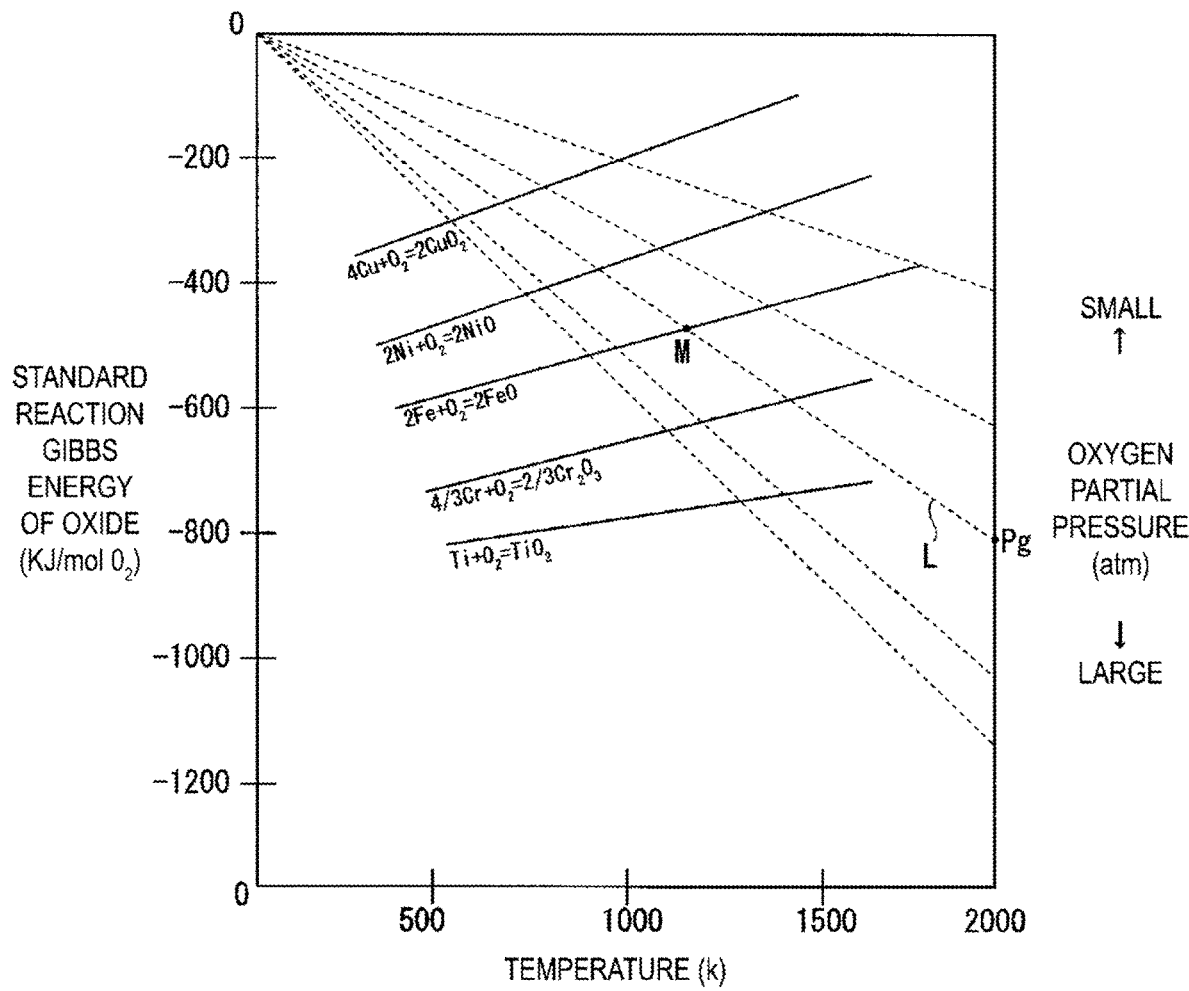
FIG. 10 is an Ellinghum diagram illustrating relationship between oxygen partial pressure and a redox equilibrium state of a metal.

Here, in the present embodiment, appropriate oxygen partial pressure is determined for each metal species on the basis of an Ellinghum diagram schematically illustrated in FIG. 10. The Ellinghum diagram is a diagram indicating whether oxidation reaction or reduction reaction proceeds when each metal species is held at a certain temperature and oxygen partial pressure. In the Ellinghum drawing, iron (Fe) is used as an example of the metal species for the determination of appropriate oxygen partial pressure. First, a straight line L passing from an origin (0 point) on the upper left in the drawing to a melting point M is drawn, and an intersection Pg of the straight line L and a graph right vertical axis (oxygen partial pressure) is determined. A value less than or equal to the intersection Pg is target oxygen partial pressure. At the melting point, when the oxygen partial pressure is Pg, an equilibrium state where neither oxidation nor reduction reaction occurs is reached, but when the oxygen partial pressure is less than Pg, reduction reaction proceeds and oxygen concentration in the metal decreases. Note that the nitrogen removal portion 11 described above also determines optimal nitrogen partial pressure on the basis of on the same Ellinghum diagram.

The atomizer 13 is connected to an end portion in the downstream side of the supply line L11. The atomizer 13 forms metal powder by spraying the treated gas described above supplied from the supply line L11 on a molten metal.

The detection portion D1 is provided in the downstream side of the oxygen removal portion 12 in the supply line L11. The detection portion D1 detects oxygen partial pressure and nitrogen partial pressure of the treated gas flowing through the supply line L11 and transmits the oxygen partial pressure and the nitrogen partial pressure to the first control device 90A described below, as an electrical signal.

One end of the circulation line L12 is connected to a portion between the detection portion D1 and the atomizer 13 on the supply line L11. The circulation line L12 extends from the one end to a portion between the inert gas supply source G and the nitrogen removal portion 11. That is, the circulation line L12 can circulate the treated gas having passed through the detection portion D1 to the upstream side of the nitrogen removal portion 11 in the supply line L11.

A valve device is provided on each of the supply line L11 and the circulation line L12. Specifically, the first valve device V11 is provided between the inert gas supply source G and the nitrogen removal portion 11 on the supply line L11. Further, the second valve device V12 is provided between the detection portion D1 and the atomizer 13 on the supply line L11. The first valve device V11 and the second valve device V12 are each a solenoid valve having an opening amount and an open/closed state that can be changed by an electrical signal input from the outside. The first valve device V11 and the second valve device V12 are electrically connected to the first control device 90A described below by a signal line not illustrated.

The tank 14 and the circulation compressor P1 are provided in this order from the upstream side (the one end side) to the downstream side on the circulation line L12. The tank 14 is a vessel for storing a portion of gas flowing on the circulation line L12. When the circulation line L12 is in an open state, the circulation compressor P1 pumps gas on the circulation line L12.

Figure 4:
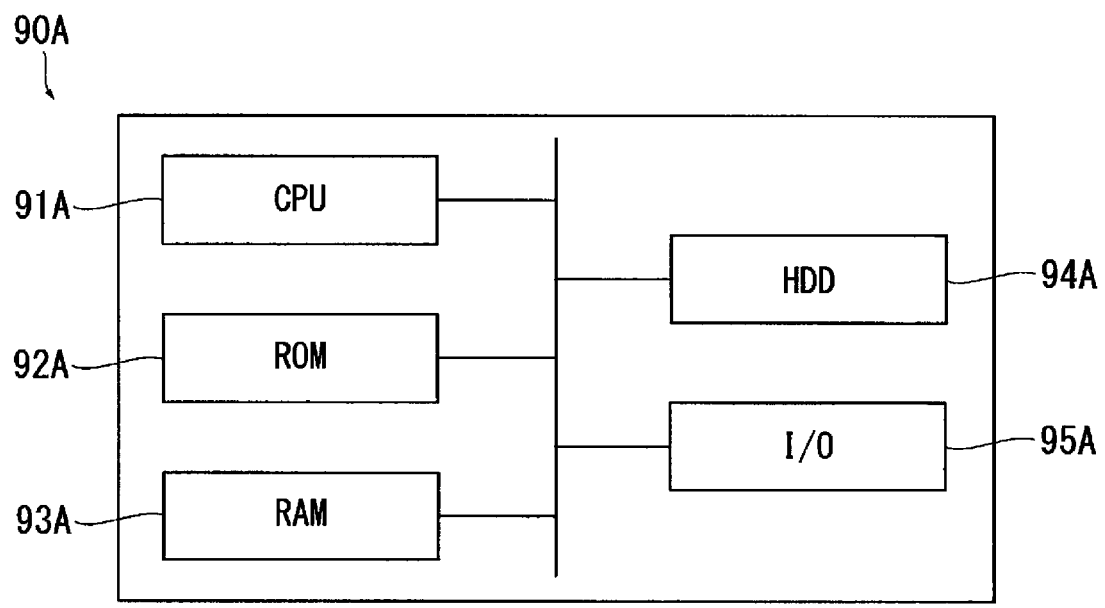
FIG. 4 is a hardware configuration diagram of a first control device according to an embodiment of the present disclosure.

An operation of the atomizing device 1 (that is, an open/closed state of each of the first valve device V11 and the second valve device V12) is controlled by the first control device 90A. As illustrated in FIG. 4, the first control device 90A is a computer including a central processing unit (CPU) 91A, a read only memory (ROM) 92A, a random access memory (RAM) 93A, a hard disk drive (HDD) 94A, and a signal reception module 95A (input/output or I/O). The signal reception module 95A receives a signal from the detection portion D1 and transmits a drive electrical signal to the first valve device V11 and the second valve device V12. The signal reception module 95A may receive a signal amplified via, for example, a charge amplifier or the like.

Figure 5:
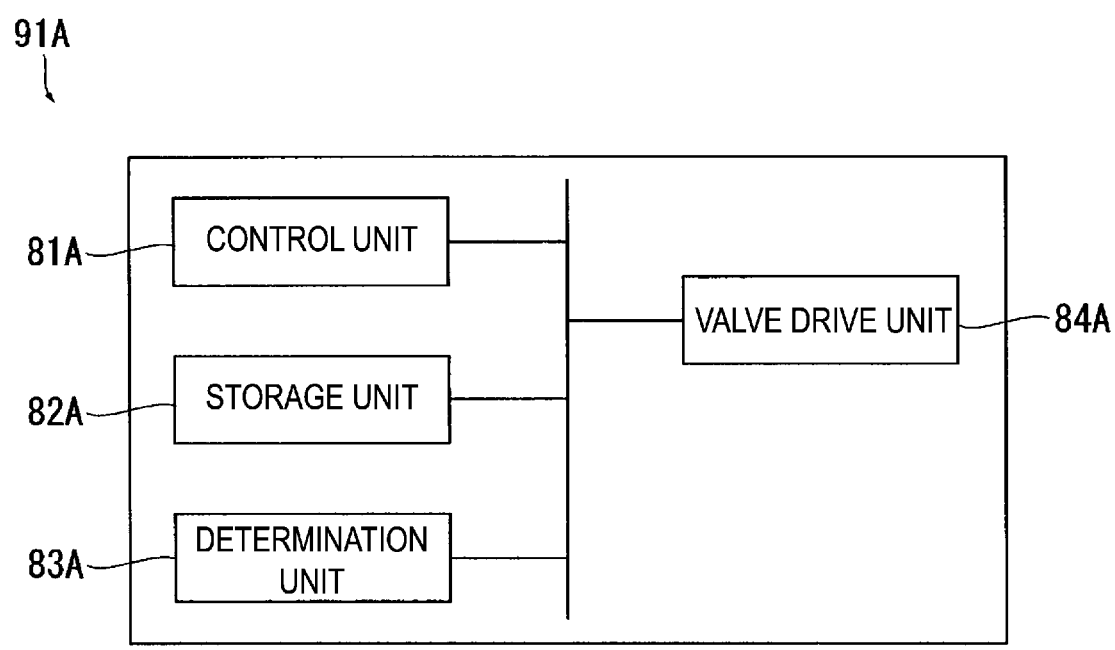
FIG. 5 is a function block diagram of a first control device according to an embodiment of the present disclosure.

As illustrated in FIG. 5, the CPU 91A of the first control device 90A includes a control unit 81A, a storage unit 82A, a determination unit 83A, and a valve drive unit 84A realized by executing a program stored in the CPU 91A in advance. The control unit 81A controls other functional units provided in the first control device 90A. The storage unit 82A stores in advance a target value (threshold value) of each of oxygen partial pressure and nitrogen partial pressure of the treated gas determined by the method described above. This target value is determined by using the Ellinghum diagram as described above. The determination unit 83A compares an actual measured value of each of oxygen partial pressure and nitrogen partial pressure of the treated gas received from the detection portion D1 and the threshold value and determines magnitude relationship. The valve drive unit 84A adjusts the open/closed state (or the opening amount) of each of the first valve device V11 and the second valve device V12 described above on the basis of a determination result in the determination unit 83A.

Figure 6:
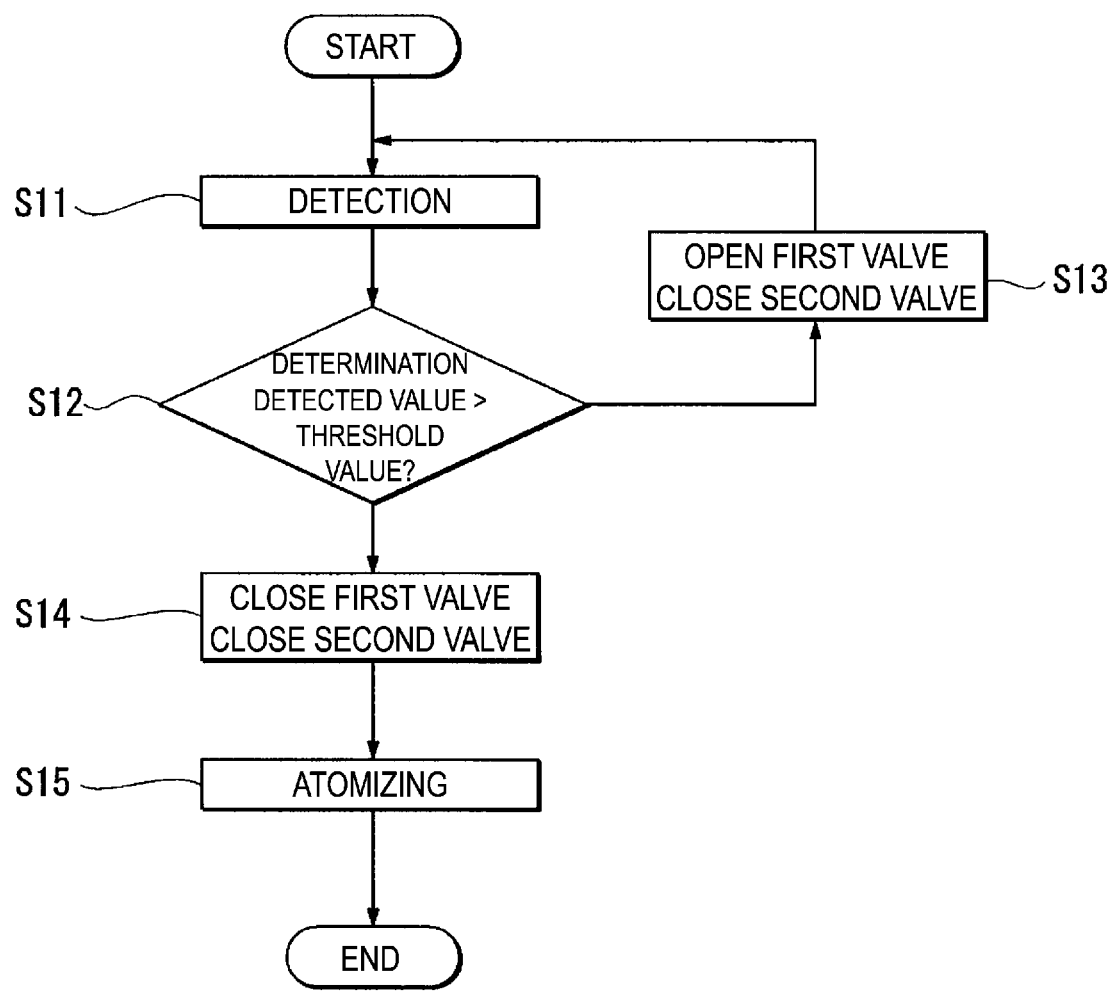
FIG. 6 is a flowchart illustrating a processing flow of a first control device according to an embodiment of the present disclosure.

Specifically, as illustrated in FIG. 6, a processing flow by the first control device 90A includes a detection step S11, a determination step S12, a first operation step S13, a second operation step S14, and an atomizing step S15. At the detection step S11, the above-described detection portion D1 detects oxygen partial pressure and nitrogen partial pressure of the treated gas. At the determination step S12, the detection result and the threshold value (described above) are compared. In a case where it is determined at the determination step S12 that the detection result is larger than the threshold value, the first operation step S13 is executed. At the first operation step S13, the first valve device V11 is opened and the second valve device V12 is closed. Accordingly, the treated gas circulates through the circulation line L12 described above to the upstream side of the nitrogen removal portion 11. Such circulation continues, and thus the treated gas passes through the nitrogen removal portion 11 and the oxygen removal portion 12 a plurality of times. In a case where the oxygen partial pressure and the nitrogen partial pressure decreases through this circulation and it is determined at the determination step S12 that the detection result is less than or equal to the threshold value, the second operation step S14 is executed. At the second operation step S14, the first valve device V11 is closed and the second valve device V12 is opened. Accordingly, the treated gas is supplied from the supply line L11 to the atomizer 13. The atomizer 13 uses the treated gas to generate metal powder (atomizing step S15).

Figure 3:
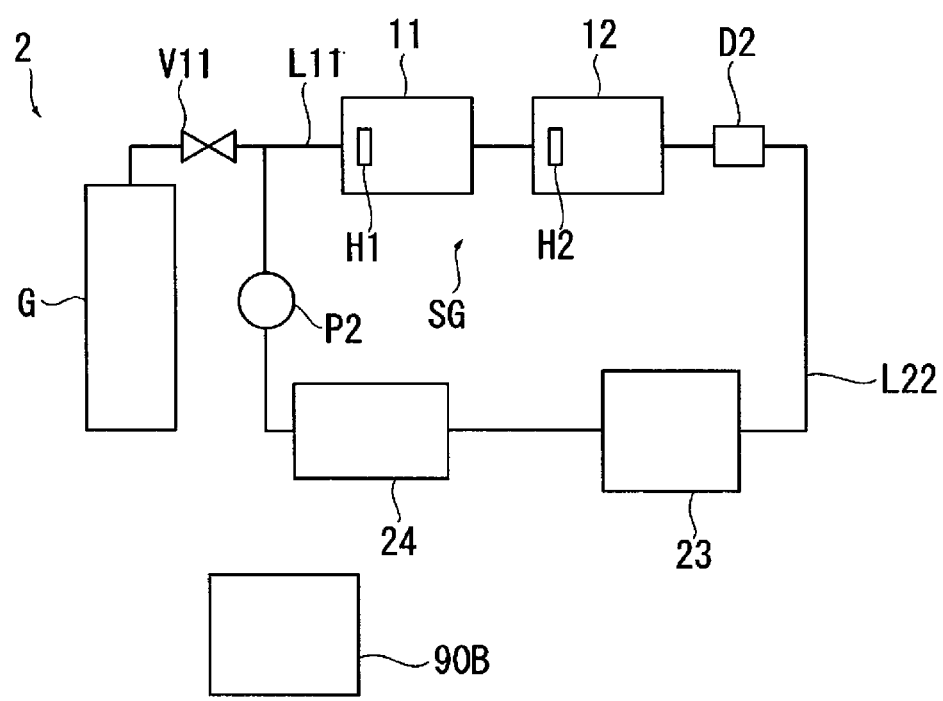
FIG. 3 is a system diagram illustrating a configuration of a 3D additive manufacturing device according to an embodiment of the present disclosure.

Then, the configuration of the 3D additive manufacturing device 2 will be described with reference to FIG. 3. As illustrated in FIG. 3, the 3D additive manufacturing device 2 includes the above-described gas supply device for a manufacturing device SG and a shaping device main body 23.

As described above, the gas supply device for a manufacturing device SG is a device for removing at least a portion of oxygen and nitrogen in the inert gas supply source G and supplying the shaping device main body 23 that follows. The gas supply device for a manufacturing device SG used in the 3D additive manufacturing device 2 includes the inert gas supply source G described above, the supply line L11 connected to the inert gas supply source G, the nitrogen removal portion 11, the oxygen removal portion 12, a detection portion D2, a circulation line L22, a circulation compressor P2, the first valve device V11, a tank 24, and a second control device 90B. One end of the circulation line L22 is connected to an end portion in the downstream side of the supply line L11. The other end of the circulation line L22 is connected to a portion between the inert gas supply source G and the nitrogen removal portion 11 in the supply line L11.

The shaping device main body 23, the tank 24, and the circulation compressor P2 are disposed in this order from the one end side to the other end side on the circulation line L22. The shaping device main body 23 forms a target shaped object by melting and layering metal powder in an atmosphere of the treated gas supplied from the circulation line L22. The tank 24 is a vessel for storing a portion of gas flowing on the circulation line L22. When the circulation line L22 is in an open state, the circulation compressor P2 pumps gas on the circulation line L22.

The detection portion D2 is provided in the downstream side of the oxygen removal portion 12 in the supply line L11. The detection portion D2 detects oxygen partial pressure and nitrogen partial pressure of the treated gas flowing through the supply line L11 and transmits the oxygen partial pressure and the nitrogen partial pressure to the second control device 90B described below, as an electrical signal.

The first valve device V11 is provided between the inert gas supply source G and the nitrogen removal portion 11 on the supply line L11. The first valve device V11 is a solenoid valve having an opening amount and an open/closed state that can be changed by an electrical signal input from the outside. The first valve device V11 is electrically connected to the second control device 90B by a signal line not illustrated.

Figure 7:
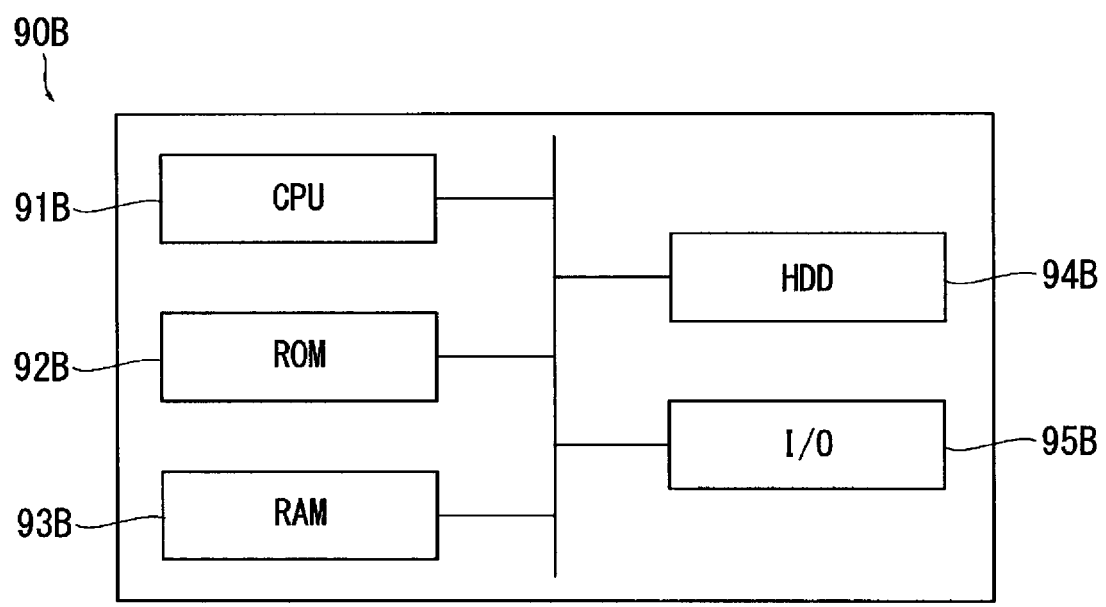
FIG. 7 is a hardware configuration diagram of a second control device according to an embodiment of the present disclosure.

An operation of the 3D additive manufacturing device 2 (that is, an open/closed state of the first valve device V11) is controlled by the second control device 90B. As illustrated in FIG. 7, the second control device 90B is a computer including a central processing unit (CPU) 91B, a read only memory (ROM) 92B, a random access memory (RAM) 93B, a hard disk drive (HDD) 94B, and a signal reception module 95B (input/output or I/O). The signal reception module 95B receives a signal from the detection portion D2 and transmits a drive electrical signal to the first valve device V11. The signal reception module 95B may receive a signal amplified via, for example, a charge amplifier or the like.

Figure 8:
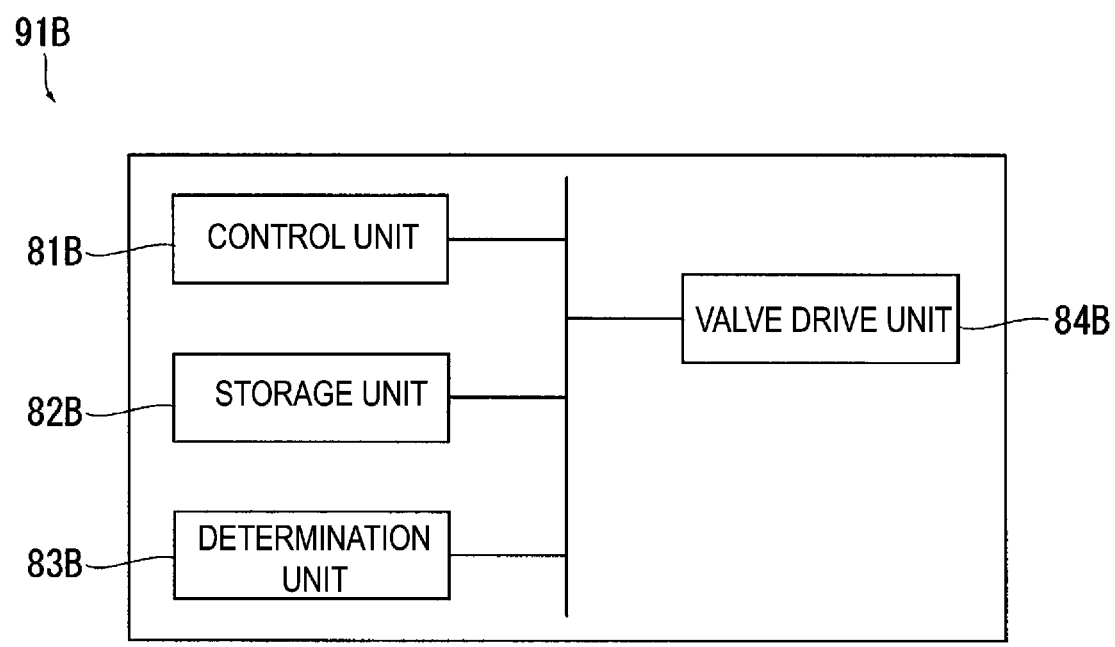
FIG. 8 is a function block diagram of a second control device according to an embodiment of the present disclosure.

As illustrated in FIG. 8, the CPU 91B of the second control device 90B includes a control unit 81B, a storage unit 82B, a determination unit 83B, and a valve drive unit 84B realized by executing a program stored in the CPU 91B in advance. The control unit 81B controls other functional units provided in the second control device 90B. The storage unit 82B stores in advance a target value (threshold value) of each of oxygen partial pressure and nitrogen partial pressure of the treated gas determined by the method described above. This target value is determined by using the Ellinghum diagram as described above. The determination unit 83B compares an actual measured value of each of oxygen partial pressure and nitrogen partial pressure of the treated gas received from the detection portion D2 and the threshold value and determines magnitude relationship. The valve drive unit 84B adjusts the open/closed state (or the opening amount) of the first valve device V11 described above on the basis of a determination result in the determination unit 83B.

Figure 9:
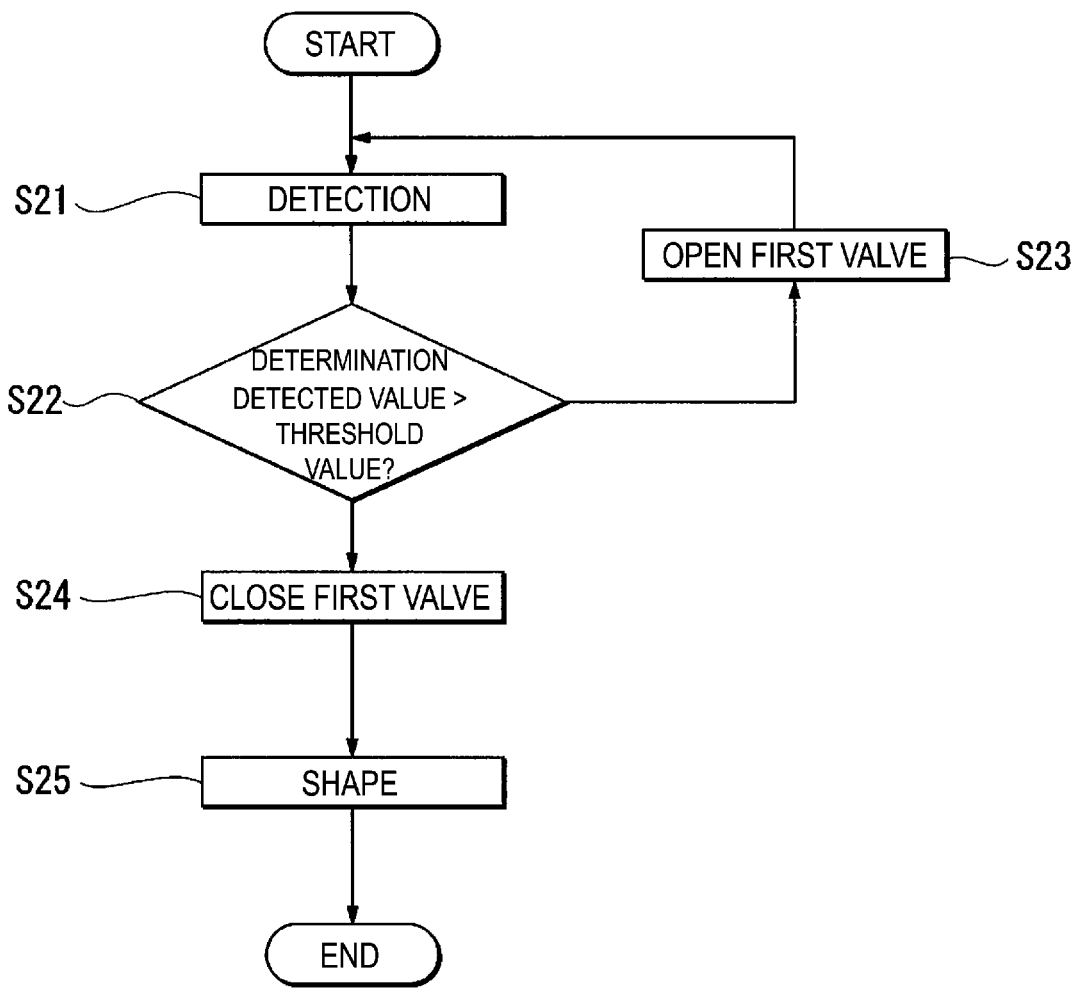
FIG. 9 is a flowchart illustrating a processing flow of a second control device according to an embodiment of the present disclosure.

Specifically, as illustrated in FIG. 9, a processing flow by the second control device 90B includes a detection step S21, a determination step S22, a first operation step S23, a second operation step S24, and a shaping step S25. At the detection step S21, the above-described detection portion D2 detects oxygen partial pressure and nitrogen partial pressure of the treated gas. At the determination step S22, the detection result and the threshold value (described above) are compared. In a case where it is determined at the determination step S22 that the detection result is larger than the threshold value, the first operation step S23 is executed. At the first operation step S23, the first valve device V11 is opened. Accordingly, the treated gas circulates through the circulation line L22 described above to the upstream side of the nitrogen removal portion 11. Such circulation continues, and thus the treated gas passes through the nitrogen removal portion 11 and the oxygen removal portion 12 a plurality of times. In a case where the oxygen partial pressure and the nitrogen partial pressure decreases through this circulation and it is determined at the determination step S22 that the detection result is less than or equal to the threshold value, the second operation step S24 is executed. At the second operation step S24, the first valve device V11 is closed. Accordingly, the treated gas is supplied from the supply line L11 to the shaping device main body 23. The shaping device main body 23 manufactures a shaped object by using the treated gas (shaping step S25).

Operational Effects

As described above, the atomizing device 1 generates fine metal powder by spraying gas on a molten metal and solidifying the metal into a particulate form. At this time, when oxygen partial pressure and nitrogen partial pressure of the sprayed gas are too high, oxygen content and nitrogen content of the generated metal powder become large. As a result, it is highly likely that a decrease in quality including creep damage and hydrogen embrittlement occurs in a shaped object manufactured by the 3D additive manufacturing device 2 that follows.

Thus, the atomizing device 1 according to the present embodiment includes the gas supply device for a manufacturing device SG described above. According to this configuration, nitrogen and oxygen in the inert gas can be removed by the nitrogen removal portion 11 and the oxygen removal portion 12, respectively. Accordingly, for example, in a case where the treated gas is used in the atomizing device 1 or the 3D additive manufacturing device 2, a decrease in quality of a product that occurs in the case of large oxygen content or large nitrogen content can be suppressed.

In addition, according to the configuration described above, the circulation line L12 connected to the supply line L11 is provided in addition to the supply line L11. Thus, oxygen partial pressure and nitrogen partial pressure can further be lowered while the inert gas circulates. Accordingly, purity of the inert gas can further be increased.

Further, according to the configuration described above, the inert gas having increased purity (that is, reduced nitrogen partial pressure and reduced oxygen partial pressure) is temporarily stored in the tank 14. The inert gas is appropriately taken out of the tank 14, and thus the inert gas can be used immediately in the atomizing device 1 or the 3D additive manufacturing device 2, for example.

Additionally, according to the configuration described above, oxygen partial pressure and nitrogen partial pressure of the treated gas are detected by the detection portion D1. The first control device 90A opens and closes the first valve device V11 and the second valve device V12 on the basis of the detection result. Specifically, when each of nitrogen partial pressure and oxygen partial pressure of the treated gas is higher than a predetermined threshold value, the first valve device V11 is opened and the second valve device V12 is closed. Accordingly, the treated gas circulates through the supply line L11 and the circulation line L12, and the treated gas can sequentially repeatedly pass through the oxygen removal portion 12 and the nitrogen removal portion 11. Accordingly, oxygen partial pressure and nitrogen partial pressure of the treated gas become small. In a case where the detection portion D1 detects that each of the oxygen partial pressure and the nitrogen partial pressure is less than or equal to the threshold value, the first control device 90A closes the first valve device V11 and opens the second valve device V12. Accordingly, the treated gas is guided from the downstream side of the supply line L11 to the atomizer 13. That is, after it is confirmed that each of the oxygen partial pressure and the nitrogen partial pressure is smaller than the threshold value, the treated gas can be used in the atomizer 13. Since the treated gas sprayed on a molten metal in the atomizer 13 has extremely small oxygen partial pressure and nitrogen partial pressure, oxygen content and nitrogen content of metal powder formed by the atomizer 13 can be made even smaller.

On the other hand, the 3D additive manufacturing device 2 irradiates the metal powder generated by the atomizing device 1 with, for example, a laser beam, and melts and solidifies the metal powder on the laser beam. A three-dimensional shaped object is manufactured by repeating this processing and layering a plurality of layers. At this time, when oxygen partial pressure and nitrogen partial pressure of gas used in an atmosphere where processing is performed are too high, oxygen content and nitrogen content of a generated shaped object become large. As a result, it is highly likely that a decrease in quality including creep damage and hydrogen embrittlement occurs in a shaped object.

Thus, the 3D additive manufacturing device 2 according to the present embodiment includes the gas supply device for a manufacturing device SG described above. According to this configuration, nitrogen and oxygen in the inert gas can be removed by the nitrogen removal portion 11 and the oxygen removal portion 12, respectively. Accordingly, in a case where the treated gas is used in the 3D additive manufacturing device 2, a decrease in quality of a product that occurs in the case of large oxygen content or large nitrogen content can be suppressed.

Further, according to the configuration described above, oxygen partial pressure and nitrogen partial pressure of the treated gas is detected by the detection portion D1. The second control device 90B opens and closes the first valve device V11 on the basis of the detection result. Specifically, when each of nitrogen partial pressure and oxygen partial pressure of the treated gas is higher than a predetermined threshold value, the first valve device V11 is opened. Accordingly, the treated gas circulates through the supply line L11 and the circulation line L22, and can sequentially repeatedly pass through the oxygen removal portion 12 and the nitrogen removal portion 11. Accordingly, oxygen partial pressure and nitrogen partial pressure of the treated gas become small. In a case where the detection portion D2 detects that each of the oxygen partial pressure and the nitrogen partial pressure is less than or equal to the threshold value, the second control device 90B closes the first valve device V11. Accordingly, the treated gas is guided through the circulation line L22 to the shaping device main body 23. That is, after it is confirmed that each of the oxygen partial pressure and the nitrogen partial pressure is smaller than the threshold value, the treated gas can be used in the shaping device main body 23. Since the treated gas used in melting metal powder has extremely small oxygen partial pressure and nitrogen partial pressure, oxygen content and nitrogen content of a shaped object can be made even smaller when shaping by the shaping device main body 23 is performed.

In addition, according to the configuration described above, the inert gas is heated by the heating portions H1 and H2 prior to being supplied to the nitrogen removal portion 11 and the oxygen removal portion 12. Specifically, prior to being supplied to the nitrogen removal portion 11, the inert gas is heated by the heating portion H1 to approximately 1000° C. In addition, the inert gas is heated by the heating portion H2 to approximately 600° C. Then, nitrogen partial pressure or oxygen partial pressure of the inert gas becomes lower in association with a temperature decrease that occurs when the inert gas is sent to the atomizer 13 and the shaping device main body 23. More specifically, reaction between hydrogen in an atmosphere of these devices and oxygen in the inert gas is promoted in association with a temperature decrease to precipitate as water in an atmosphere. Accordingly, the inert gas is heated prior to being supplied to use environment and subsequently cooled for use. Thus, oxygen partial pressure of the inert gas can be made lower.

Further, according to the method described above, a target value of nitrogen partial pressure can be easily determined for each metal species on the basis of the Ellinghum diagram. In addition, nitridation does not occur in an environment having nitrogen partial pressure less than or equal to the nitrogen partial pressure determined as described above. Accordingly, for example, atomizing and 3D additive manufacturing can proceed in an environment where nitridation of a metal species does not proceed.

Similarly, according to the method described above, a target value of oxygen partial pressure can be easily determined for each metal species on the basis of the Ellinghum diagram. In addition, in an environment of the oxygen partial pressure determined as described above, reduction reaction proceeds and oxygen concentration in a metal decreases. Accordingly, for example, atomizing and 3D additive manufacturing can proceed, in an environment where reduction of a metal species proceeds.

OTHER EMBODIMENTS

The embodiment of the present disclosure is described above in detail with reference to the drawings. However, a specific configuration is not limited to this embodiment, and also includes design change or the like without departing from the gist of the present disclosure. For example, in the embodiment described above, the method for determining oxygen partial pressure based on the Ellinghum diagram is described by using iron as an example. However, a metal species used in the atomizing device 1 and the 3D additive manufacturing device 2 is not limited to iron, and the determination method can suitably be used for other metal species.

Further, in the embodiment described above, the example in which the oxygen removal portion 12 is provided in the downstream side of the nitrogen removal portion 11 on the supply line L11 is described. However, in contrast, the oxygen removal portion 12 can be provided in the upstream side and the nitrogen removal portion 11 can be provided in the downstream side of the oxygen removal portion 12.

Additionally, unlike the embodiment described above, a configuration in which each of the circulation lines L12 and L22 is provided for each of the nitrogen removal portion 11 and the oxygen removal portion 12 can also be employed. According to this configuration, nitrogen partial pressure and oxygen partial pressure can be adjusted independently precisely.

Notes

The gas supply device for a manufacturing device SG, the atomizer 1, the 3D additive manufacturing device 2, the additive manufacturing system 100, the shaped object, and the gas supply method for a manufacturing device according to each of the embodiments described above are understood as follows, for example.

(1) A gas supply device for a manufacturing device SG according to a first aspect includes an inert gas supply source G that supplies inert gas, a supply line L11 connected to the inert gas supply source G, a nitrogen removal portion 11 that is provided on the supply line L11 and that removes at least a portion of nitrogen in the inert gas, and an oxygen removal portion 12 that is provided on the supply line L11 and that removes at least a portion of oxygen in the inert gas.

According to this configuration, nitrogen and oxygen in the inert gas can be removed by the nitrogen removal portion 11 and the oxygen removal portion 12, respectively. Accordingly, in a case where, for example, the treated gas is used in the atomizing device 1 or the 3D additive manufacturing device 2, a decrease in quality of a product that occurs in the case of large oxygen content or large nitrogen content can be suppressed.

(2) The gas supply device for a manufacturing device SG according to a second aspect further includes a circulation line L12 that connects an end portion in a downstream side of the supply line L11 and a position in a downstream side of the inert gas supply source G and in an upstream side of the nitrogen removal portion 11 and the oxygen removal portion 12, and a circulation compressor P1 provided on the circulation line L12.

According to the configuration described above, the circulation line L12 connected to the supply line L11 is provided in addition to the supply line L11. Thus, oxygen partial pressure and nitrogen partial pressure can further be lowered while the inert gas circulates. Accordingly, purity of the inert gas can further be increased.

(3) The gas supply device for a manufacturing device SG according to a third aspect further includes
a tank 14 that is provided on the circulation line L12 and that stores the inert gas.

According to the configuration described above, the inert gas having increased purity (that is, reduced nitrogen partial pressure and reduced oxygen partial pressure) is temporarily stored in the tank 14. The inert gas is appropriately taken out of the tank 14, and thus the inert gas can be used immediately in the atomizing device 1 or the 3D additive manufacturing device 2, for example.

(4) The gas supply device for a manufacturing device SG according to a fourth aspect further includes
a detection portion D1 that is provided on the supply line L11 and that detects oxygen partial pressure and nitrogen partial pressure of the inert gas having passed through the nitrogen removal portion 11 and the oxygen removal portion 12, a first valve device V11 provided in a side of the inert gas supply source G of a connection portion with the circulation line L12 on the supply line L11, a second valve device V12 provided in a downstream side of the connection portion with the circulation line L12 on the supply line L11, and a control device (first control device 90A) that opens and closes the first valve device V11 and the second valve device V12 on the basis of a detection result of the detection portion D1, wherein the control device is configured to open the first valve device V11 and close the second valve device V12 in a state where nitrogen partial pressure and oxygen partial pressure of the inert gas detected by the detection portion D1 are higher than predetermined threshold values, and, the control device is configured to close the first valve device V11 and open the second valve device V12 in a state where the nitrogen partial pressure and the oxygen partial pressure are less than or equal to the threshold values.

In the configuration described above, oxygen partial pressure and nitrogen partial pressure of the treated gas are detected by the detection portion D1. The control device opens and closes the first valve device V11 and the second valve device V12 on the basis of the detection result. Specifically, in a state where nitrogen partial pressure and oxygen partial pressure of the treated gas are higher than predetermined threshold values, the first valve device V11 is opened and the second valve device V12 is closed. Accordingly, the treated gas circulates through the supply line L11 and the circulation line L12, and can sequentially repeatedly pass through the oxygen removal portion 12 and the nitrogen removal portion 11. Accordingly, oxygen partial pressure and nitrogen partial pressure of the treated gas become small. In a case where the detection portion D1 detects that the oxygen partial pressure and the nitrogen partial pressure are less than or equal to the threshold values, the control device closes the first valve device V11 and opens the second valve device V12. Accordingly, the treated gas is guided from the downstream side of the supply line L11 to, for example, the atomizer 13. That is, after it is confirmed that the oxygen partial pressure and the nitrogen partial pressure are smaller than the threshold values, the inert gas can be used in the atomizer 13. Since the treated gas sprayed on a molten metal in the atomizer 13 has extremely small oxygen partial pressure and nitrogen partial pressure, oxygen content and nitrogen content of metal powder formed by the atomizer 13 can be made even smaller.

(5) In the gas supply device for a manufacturing device SG according to a fifth aspect, the control device (second control device 90B) is configured to open the first valve device V11 in a state where the nitrogen partial pressure and the oxygen partial pressure of the inert gas detected by the detection portion D2 are higher than predetermined threshold values, and the control device is configured to close the first valve device V11 in a state where the nitrogen partial pressure and the oxygen partial pressure are less than or equal to the threshold values.

In the configuration described above, oxygen partial pressure and nitrogen partial pressure of the treated gas are detected by the detection portion D2. The control device opens and closes the first valve device V11 on the basis of the detection result. Specifically, when the nitrogen partial pressure and the oxygen partial pressure of the treated gas are higher than predetermined threshold values, the first valve device V11 is opened. Accordingly, the treated gas circulates through the supply line L11 and the circulation line L22, and can sequentially repeatedly pass through the oxygen removal portion 12 and the nitrogen removal portion 11. Accordingly, the oxygen partial pressure and the nitrogen partial pressure of the treated gas become small. In a case where the detection portion D2 detects that the oxygen partial pressure and the nitrogen partial pressure are less than or equal to the threshold values, the control device closes the first valve device V11. Accordingly, the treated gas is guided through the circulation line to the shaping device main body 23 that performs 3D additive manufacturing. That is, after it is confirmed that the oxygen partial pressure and the nitrogen partial pressure are smaller than the threshold values, the treated gas can be used in the shaping device main body 23. Since the treated gas used in melting metal powder has extremely small oxygen partial pressure and nitrogen partial pressure, oxygen content and nitrogen content of a shaped object can be made even smaller when shaping by the shaping device main body 23 is performed.

(6) The gas supply device for a manufacturing device SG according to a sixth aspect further includes
a heating portion H1, H2 that is provided between the nitrogen removal portion 11 and the oxygen removal portion 12, and the inert gas supply source G, and that heats the inert gas supplied from the inert gas supply source G to the supply line L11.

According to the configuration described above, the inert gas is heated by the heating portion H1, H2 prior to being supplied to the nitrogen removal portion 11 and the oxygen removal portion 12. Specifically, the heating portion H1, H2 heats the inert gas to approximately 600° C. Then, nitrogen partial pressure or oxygen partial pressure of the inert gas becomes lower in association with a temperature decrease that occurs when the inert gas is sent to an atomizer and a shaping device. More specifically, reaction between hydrogen in an atmosphere of these devices and oxygen in the inert gas is promoted in association with a temperature decrease to precipitate as water in an atmosphere. Accordingly, the inert gas is heated prior to being supplied to a use environment and subsequently cooled for use. Thus, oxygen partial pressure of the inert gas can be made lower.

(7) In the gas supply device for a manufacturing device SG according to a seventh aspect,
in the oxygen removal portion 12, a straight line L that passes through a inciting point of a preselected metal species on an Ellinghum diagram with standard reaction Gibbs energy on a left vertical axis and oxygen partial pressure on a right vertical axis and that passes through an origin on the left vertical axis of the Ellinghum diagram is defined, and a value less than or equal to a value on the right vertical axis through which the straight line L passes is defined as a target value Pg of oxygen partial pressure of the inert gas.

According to the configuration described above, a target value of oxygen partial pressure can be determined easily for each metal species on the basis of the Ellinghum diagram. In addition, reduction reaction of the metal occurs in an environment having oxygen partial pressure less than or equal to the oxygen partial pressure determined as described above. Accordingly, for example, atomizing and 3D additive manufacturing can proceed in a reducing atmosphere environment where oxygen concentration in a metal decreases.

(8) In the gas supply device for a manufacturing device SG according to an eighth aspect,
in the nitrogen removal portion 11, a straight line L that passes through a melting point of a preselected metal species on an Ellinghum diagram with standard reaction Gibbs energy on a left vertical axis and nitrogen partial pressure on a right vertical axis and that passes through an origin on the left vertical axis of the Ellinghum diagram is defined, and a value less than or equal to a value on the right vertical axis through which the straight line L passes is defined as a target value of nitrogen partial pressure of the inert gas.

According to the configuration described above, a target value of nitrogen partial pressure can be determined easily for each metal species on the basis of the Ellinghum diagram. In addition, nitridation of the metal species does not occur in an environment having nitrogen partial pressure less than or equal to the nitrogen partial pressure determined as described above. Accordingly, for example, atomizing and 3D additive manufacturing can proceed in an environment where nitridation of a metal species does not proceed.

(9) An atomizing device 1 according to a ninth aspect includes the gas supply device for a manufacturing device SG according to any one of the aspects described above, and an atomizer 13 that forms metal powder by spraying the inert gas supplied from the gas supply device for a manufacturing device SG on a molten metal.

According to the configuration described above, oxygen content and nitrogen content of the metal powder formed by the atomizing device 1 can be made small.

(10) A 3D additive manufacturing device 2 according to a tenth aspect includes the gas supply device for a manufacturing device SG according to any one of the aspects described above, and a shaping device main body 23 that performs shaping by melting and layering metal powder in an atmosphere of the inert gas supplied from the gas supply device for a manufacturing device SG.

According to the configuration described above, an amount of oxygen and nitrogen in an atmosphere during shaping by the 3D additive manufacturing device 2 can be made small. As a result, oxygen content and nitrogen content of a shaped object can be made even smaller.

(11) An additive manufacturing system 100 according to an eleventh aspect includes the atomizing device 1 according to the ninth aspect, and the 3D additive manufacturing device 2 according to the tenth aspect.

According to the configuration described above, oxygen content and nitrogen content of metal powder formed by the atomizing device 1 can be made small, and in addition, an amount of oxygen and nitrogen in an atmosphere during shaping by the 3D additive manufacturing device 2 can also be made small. As a result, oxygen content and nitrogen content of a shaped object can be made even smaller.

(12) A shaped object according to a twelfth aspect is manufactured by the additive manufacturing system according to the eleventh aspect.

According to the configuration described above, a shaped object having even smaller oxygen content and nitrogen content can be provided.

(13) A gas supply method for a manufacturing device according to a thirteenth aspect includes a nitrogen removal step of removing at least a portion of nitrogen in inert gas, and an oxygen removal step of removing at least a portion of oxygen in the inert gas.

According to this method, nitrogen and oxygen in the inert gas can be removed at the nitrogen removal step and the oxygen removal step, respectively. Accordingly, in a case where, for example, the treated gas is used in the atomizing device 1 or the 3D additive manufacturing device 2, a decrease in quality of a product that occurs in the case of large oxygen content or large nitrogen content can be suppressed.

(14) The gas supply method for a manufacturing device according to a fourteenth aspect further includes a circulation step of repeating the nitrogen removal step and the oxygen removal step after the nitrogen removal step and the oxygen removal step.

According to the method described above, the inert gas is again subjected to the nitrogen removal step and the oxygen removal step at the circulation step. Accordingly, oxygen partial pressure and nitrogen partial pressure can further be lowered while the inert gas circulates. That is, purity of the inert gas can further be increased.

(15) In the gas supply method for a manufacturing device according to a fifteenth aspect, at the oxygen removal step, a straight line that passes through a melting point of a preselected metal species on an Ellinghum diagram with standard reaction Gibbs energy on a left vertical axis and oxygen partial pressure on a right vertical axis and that passes through an origin on the left vertical axis of the Ellinghum diagram is defined, and a value less than or equal to a value on the right vertical axis through which the straight line passes is defined as a target value of oxygen partial pressure of the inert gas.

According to the method described above, a target value of nitrogen partial pressure can be determined easily for each metal species on the basis of the Ellinghum diagram. In addition, a state where nitridation of the metal species does not occur can be maintained in an environment having nitrogen partial pressure less than or equal to the nitrogen partial pressure determined as described above. Accordingly, for example, atomizing and 3D additive manufacturing can proceed in an environment where nitridation of a metal species does not occur.

(16) In the gas supply method for a manufacturing device according to a sixteenth aspect, at the nitrogen removal step, a straight line that passes through a melting point of a preselected metal species on an Ellinghum diagram with standard reaction Gibbs energy on a left vertical axis and nitrogen partial pressure on a right vertical axis and that passes through an origin on the left vertical axis of the Ellinghum diagram is defined, and a value less than or equal to a value on the right vertical axis through which the straight line passes is defined as a target value of nitrogen partial pressure of the inert gas.

According to the method described above, a target value of oxygen partial pressure can be determined easily for each metal species on the basis of the Ellinghum diagram. In addition, reduction reaction of the metal occurs in an environment having oxygen partial pressure less than or equal to the oxygen partial pressure determined as described above. Accordingly, for example, atomizing and 3D additive manufacturing can proceed in a reducing atmosphere where oxygen concentration in a metal decreases.

While preferred embodiments of the invention have been described as above, it is to be understood that variations and modifications will be apparent to those skilled in the art without departing from the scope and spirits of the invention. The scope of the invention, therefore, is to be determined solely by the following claims.

The invention claimed is:

1. A gas supply device for a manufacturing device, comprising:
an inert gas supply source that supplies inert gas;
a supply line connected to the inert gas supply source;
a nitrogen removal portion that is provided on the supply line and that removes at least a portion of nitrogen in the inert gas;
an oxygen removal portion that is provided on the supply line and that removes at least a portion of oxygen in the inert gas, the nitrogen removal portion and the oxygen removal portion being arranged in series on the supply line;
a circulation line that is connected to a first point on the supply line that is downstream of the nitrogen removal portion and the oxygen removal portion, and that is connected to a second point on the supply line that is downstream of the inert gas supply source and upstream of the nitrogen removal portion and the oxygen removal portion;
a detection portion that is provided on the supply line and that detects oxygen partial pressure and nitrogen partial pressure of the inert gas having passed through the nitrogen removal portion and the oxygen removal portion;
a first valve device provided on the supply line, the first valve device being positioned downstream of the inert gas supply source and upstream of the second point at which the circulation line is connected to the supply line;
a second valve device provided on the supply line, the second valve device being positioned downstream of the first point at which the circulation line is connected to the supply line; and
a control device that opens and closes the first valve device and the second valve device based on a detection result of the detection portion, wherein
the control device is configured to open the first valve device and close the second valve device in a state where the nitrogen partial pressure and oxygen partial pressure of the inert gas detected by the detection portion are higher than predetermined threshold values, and the control device is configured to close the first valve device and open the second valve device in a state where the nitrogen partial pressure and the oxygen partial pressure are less than or equal to the predetermined threshold values.

2. The gas supply device for a manufacturing device according to claim 1, further comprising
a circulation compressor provided on the circulation line.

3. The gas supply device for a manufacturing device according to claim 2, further comprising a tank that is provided on the circulation line and that stores the inert gas.

4. The gas supply device for a manufacturing device according to claim 1, further comprising first and second heating portions configured to heat the inert gas supplied from the inert gas supply source, the first heating portion being provided between the inert gas supply source and the nitrogen removal portion, and the second heating portion being provided between the nitrogen removal portion and the oxygen removal portion.

5. The gas supply device for a manufacturing device according to claim 1, wherein
in the oxygen removal portion, a straight line that passes through a melting point of a preselected metal species on an Ellinghum diagram with standard reaction Gibbs energy on a left vertical axis and oxygen partial pressure on a right vertical axis and that passes through an origin on the left vertical axis of the Ellinghum diagram is defined, and a value less than or equal to a value on the right vertical axis through which the straight line passes is defined as a target value of oxygen partial pressure of the inert gas.

6. The gas supply device for a manufacturing device according to claim 1, wherein
in the nitrogen removal portion, a straight line that passes through a melting point of a preselected metal species on an Ellinghum diagram with standard reaction Gibbs energy on a left vertical axis and nitrogen partial pressure on a right vertical axis and that passes through an origin on the left vertical axis of the Ellinghum diagram is defined, and a value less than or equal to a value on the right vertical axis through which the straight line passes is defined as a target value of nitrogen partial pressure of the inert gas.

7. An atomizing device, comprising:
the gas supply device for a manufacturing device according to claim 1; and
an atomizer that forms metal powder by spraying the inert gas supplied from the gas supply device for a manufacturing device on a molten metal.

8. An additive manufacturing system, comprising:
the atomizing device according to claim 7; and
a 3-D additive manufacturing device including a shaping device main body that performs shaping by melting and layering metal powder in an atmosphere of the inert gas supplied from the gas supply device for a manufacturing device.

9. A 3D additive manufacturing device, comprising:
the gas supply device for a manufacturing device according to claim 1; and
a shaping device main body that performs shaping by melting and layering metal powder in an atmosphere of the inert gas supplied from the gas supply device for a manufacturing device.

10. A gas supply device for a manufacturing device, comprising:
an inert gas supply source that supplies inert gas;
a supply line connected to the inert gas supply source;
a nitrogen removal portion that is provided on the supply line and that removes at least a portion of nitrogen in the inert gas;
an oxygen removal portion that is provided on the supply line and that removes at least a portion of oxygen in the inert gas, the nitrogen removal portion and the oxygen removal portion being arranged in series on the supply line;
a circulation line that is connected to a first point on the supply line that is downstream of the nitrogen removal portion and the oxygen removal portion, and that is connected to a second point on the supply line that is downstream of the inert gas supply source and upstream of the nitrogen removal portion and the oxygen removal portion;
a detection portion that is provided on the supply line and that detects oxygen partial pressure and nitrogen partial pressure of the inert gas having passed through the nitrogen removal portion and the oxygen removal portion;
a first valve device provided on the supply line, the first valve device being positioned downstream of the inert gas supply source and upstream of the second point at which the circulation line is connected to the supply line; and a control device that opens and closes the first valve device based on a detection result of the detection portion, wherein the control device is configured to open the first valve device in a state where the nitrogen partial pressure and oxygen partial pressure of the inert gas detected by the detection portion are higher than predetermined threshold values, and the control device is configured to close the first valve device in a state where the nitrogen partial pressure and the oxygen partial pressure are less than or equal to the predetermined threshold values.

* * * * *